United States Patent
Hayato et al.

(10) Patent No.: US 9,280,682 B2
(45) Date of Patent: Mar. 8, 2016

(54) AUTOMATED MANAGEMENT OF PRIVATE INFORMATION

(71) Applicant: GLOBAL FOUNDRIES INC., Grand Cayman (KY)

(72) Inventors: Kiriyama Hayato, Kawasaki (JP); Tomohiro Shioya, Tokyo (JP); Tadashi Tsumura, Tokyo (JP)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/362,635

(22) PCT Filed: Sep. 20, 2012

(86) PCT No.: PCT/JP2012/074110
§ 371 (c)(1),
(2) Date: Jun. 4, 2014

(87) PCT Pub. No.: WO2013/084563
PCT Pub. Date: Jun. 13, 2013

(65) Prior Publication Data
US 2014/0344948 A1    Nov. 20, 2014

(30) Foreign Application Priority Data
Dec. 5, 2011   (JP) ................................ 2011-266150

(51) Int. Cl.
*G06F 21/60*        (2013.01)
*G06F 21/62*        (2013.01)

(52) U.S. Cl.
CPC .......... *G06F 21/6218* (2013.01); *G06F 21/604* (2013.01); *G06F 21/6245* (2013.01)

(58) Field of Classification Search
CPC ...................................................... G06F 21/60
USPC .......................................................... 726/26
See application file for complete search history.

(56) References Cited

U.S. PATENT DOCUMENTS

| 8,244,848 | B1* | 8/2012 | Narayanan et al. ........... 709/223 |
| 8,763,149 | B1* | 6/2014 | Cohen et al. .................... 726/27 |

(Continued)

FOREIGN PATENT DOCUMENTS

| JP | 2000082001 A | 3/2000 |
| JP | 2002183351 A | 6/2002 |

(Continued)

OTHER PUBLICATIONS

International Preliminary Report on Patentability, dated Jun. 19, 2014, regarding Application No. PCT/JP2012/074110, 5 pages.

(Continued)

*Primary Examiner* — William Powers
(74) *Attorney, Agent, or Firm* — Thompson Hine LLP

(57) ABSTRACT

A private information management apparatus, a method, and a program that allows individual users to easily set and apply their privacy rules. A private information management apparatus receives setting data from a user terminal and creates a privacy rule that defines a condition for restricting disclosure of private information and a restriction method. If undisclosed image data contains private information of a user, the private information management apparatus extracts metadata contained in this undisclosed image data, and determines whether or not the metadata satisfies the condition for restricting disclosure of the private information. If it is determined that the condition is satisfied, the private information management apparatus executes the restriction method defined by the privacy rule.

19 Claims, 9 Drawing Sheets

(56) References Cited

U.S. PATENT DOCUMENTS

| | | | |
|---|---|---|---|
| 2008/0104679 A1* | 5/2008 | Craig | 726/4 |
| 2009/0031301 A1* | 1/2009 | D'Angelo et al. | 717/178 |
| 2010/0141778 A1 | 6/2010 | Basson et al. | |
| 2011/0044512 A1* | 2/2011 | Bambha et al. | 382/118 |
| 2011/0103696 A1 | 5/2011 | Mizuno | |
| 2011/0238755 A1* | 9/2011 | Khan et al. | 709/204 |
| 2012/0121187 A1* | 5/2012 | Lee et al. | 382/195 |
| 2012/0304265 A1* | 11/2012 | Richter et al. | 726/7 |
| 2013/0104080 A1* | 4/2013 | Bosworth et al. | 715/838 |
| 2014/0059135 A1 | 2/2014 | Stan et al. | |

FOREIGN PATENT DOCUMENTS

| | | | |
|---|---|---|---|
| JP | 2003091457 A | 3/2003 | |
| JP | 2006293455 A | 10/2006 | |
| JP | 2007213177 A | 8/2007 | |
| JP | 2008517402 A | 5/2008 | |
| JP | 2009199513 A | 9/2009 | |
| JP | 2010044625 A | 2/2010 | |
| JP | 2010097336 A | 4/2010 | |
| JP | 2010136373 A | 6/2010 | |
| JP | 2010238237 A | 10/2010 | |
| JP | 2010539565 A | 12/2010 | |
| JP | 2011120214 A | 6/2011 | |
| JP | 4764897 B2 | 9/2011 | |
| JP | 2014514630 A | 6/2014 | |

OTHER PUBLICATIONS

"Me on the Web," Google, originally accessed Nov. 24, 2011, 2 pages. http://www.google.com/support/accounts/bin/answer.py?hl=ja&answer=1181793.

* cited by examiner

FIG. 4

```
<Rule RuleId="rule1" Effect="Deny">
  <Target>
    <Subjects><Subject><AnySubject/></Subject></Subjects>
    <Resources>
      <Resource>
        <ResourceMatch MatchId="function:person-match>
          <ResourceAttributeDesignator
            AttrubuteId="identifier:person"
            DataType="person" />
          <AttributeValue>A</AttributeValue>
        </ResourceMatch>
        <ResourceMatch MatchId="function:dateTime-greater-than>
          <ResourceAttributeDesignator
            AttrubuteId="identifier:dateTime"
            DataType="dateTime" />
          <AttributeValue>2011-08-01T17:00:00+09:00</AttributeValue>
        </ResourceMatch>
        <ResourceMatch MatchId="function:dateTimeime-less-than>
          <ResourceAttributeDesignator
            AttrubuteId="identifier:dateTimeime"
           DataType="dateTime" />
          <AttributeValue>2011-08-01T23:00:00+09:00</AttributeValue>
        </ResourceMatch>
        <ResourceMatch MatchId="function:location-around>
          <ResourceAttributeDesignator
            AttrubuteId="identifier:location"
            DataType="location" />
          <AttributeValue>35.658735,139.701363</AttributeValue>
          <ResourceAttributeDesignator
            AttrubuteId="identifier:location"
            DataType="radius" />
          <AttributeValue>10000</AttributeValue>
        </ResourceMatch>
      </Resource>
    </Resources>
    <Actions><Action>write</Action></Actions>
  </Target>
</Rule>
<Obligations>
  <Obligation ObligationId="email" FulfillOn="Deny">
    <AttributeAssignment AttributeId="MailTo" DataType="string">
      <AttributeSelector RequestContextPath="profile:myself"/>
    </AttributeAssignment>
    <AttributeAssignment AttributeId="text" DataType="string">
    Your privacy would have been violated.
    </AttributeAssignment>
  </Obligation>
</Obligations>
```

FIG. 5

```
<Rule RuleId="rule_deny_post" Effect="Deny">
  <Target>
    <Subjects><Subject><AnySubject/></Subject></Subjects>
    <Resources><Resource>…</Resource></Resources>
    <Actions><Action>write</Action></Actions>
  </Target>
</Rule>
<Obligations>
  <Obligation ObligationId="alert" FulfillOn="Deny">
    <AttributeAssignment AttributeId="Popup" DataType="string">
      <AttributeSelector RequestContextPath="profile:writer"/>
    </AttributeAssignment>
    <AttributeAssignment AttributeId="text" DataType="string">
    Public posting denied due to violation of A's privacy
    </AttributeAssignment>
  </Obligation>
</Obligations>
```

FIG. 6

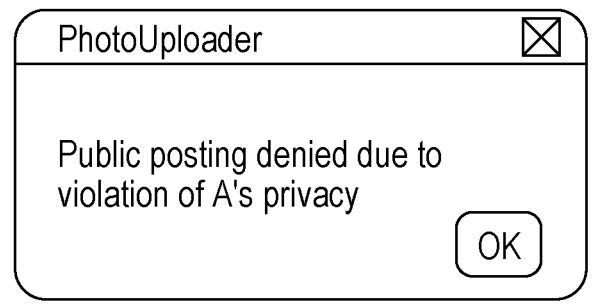

FIG. 7

```
<Rule RuleId="rule_request_approval" Effect="Deny">
 <Target>
   <Subjects><Subject><AnySubject/></Subject></Subjects>
   <Resources><Resource>...</Resource></Resources>
   <Actions><Action>write</Action></Actions>
 </Target>
</Rule>
<Obligations>
 <Obligation ObligationId="alert" FulfillOn="Deny">
   <AttributeAssignment AttributeId="SendTo" DataType="string">
    <AttributeSelector RequestContextPath="profile:myself"/>
   </AttributeAssignment>
   <AttributeAssignment AttributeId="text" DataType="string">
   Your private information may be going to be made public.
    Do you approve this action?
   </AttributeAssignment>
   <AttributeAssignment AttributeId="content" DataType="link">
    <AttributeSelector RequestContextPath="resource:content"/>
   </AttributeAssignment>
 </Obligation>
</Obligations>
```

FIG. 8

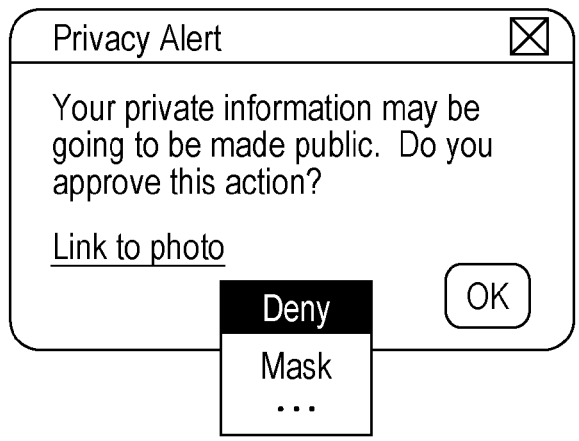

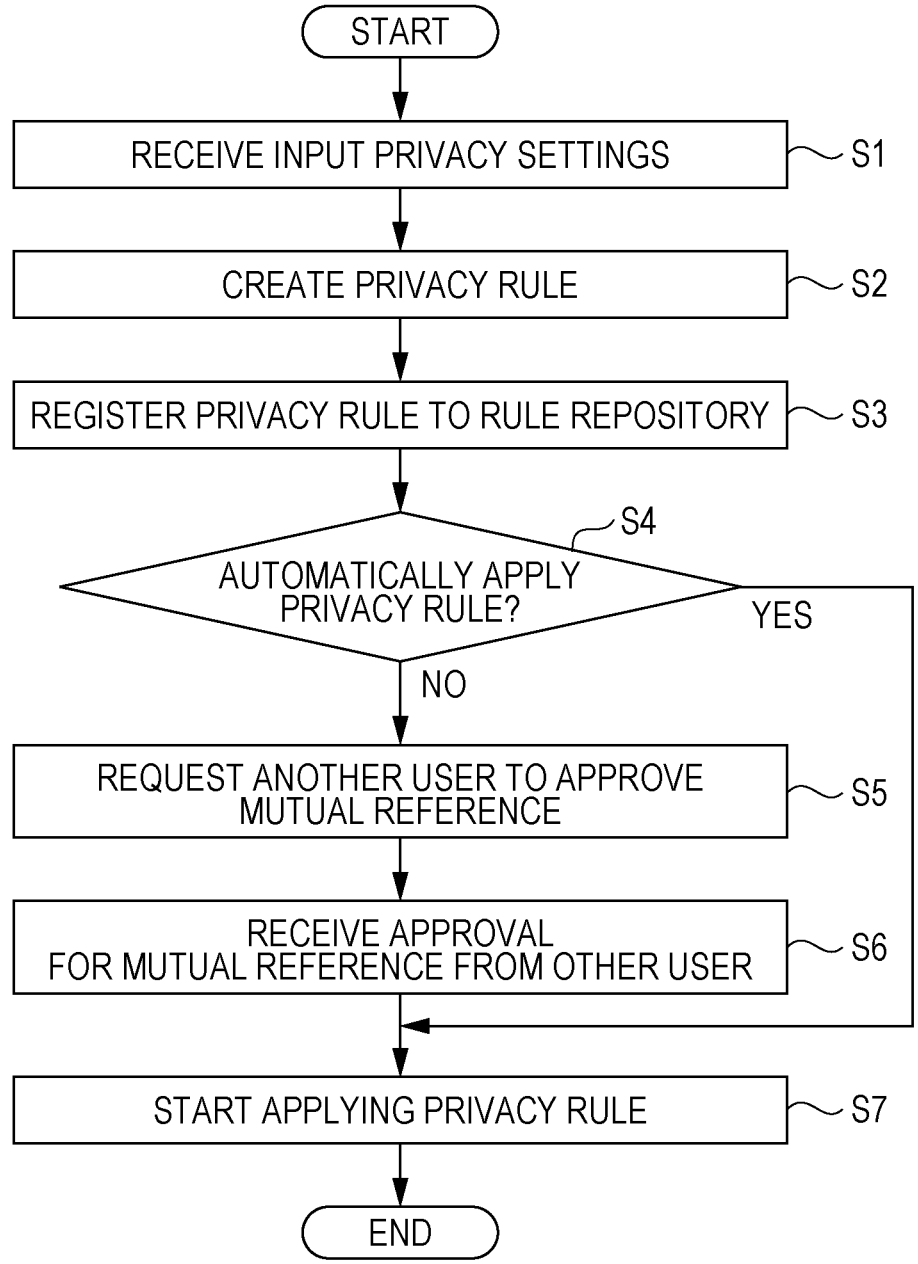

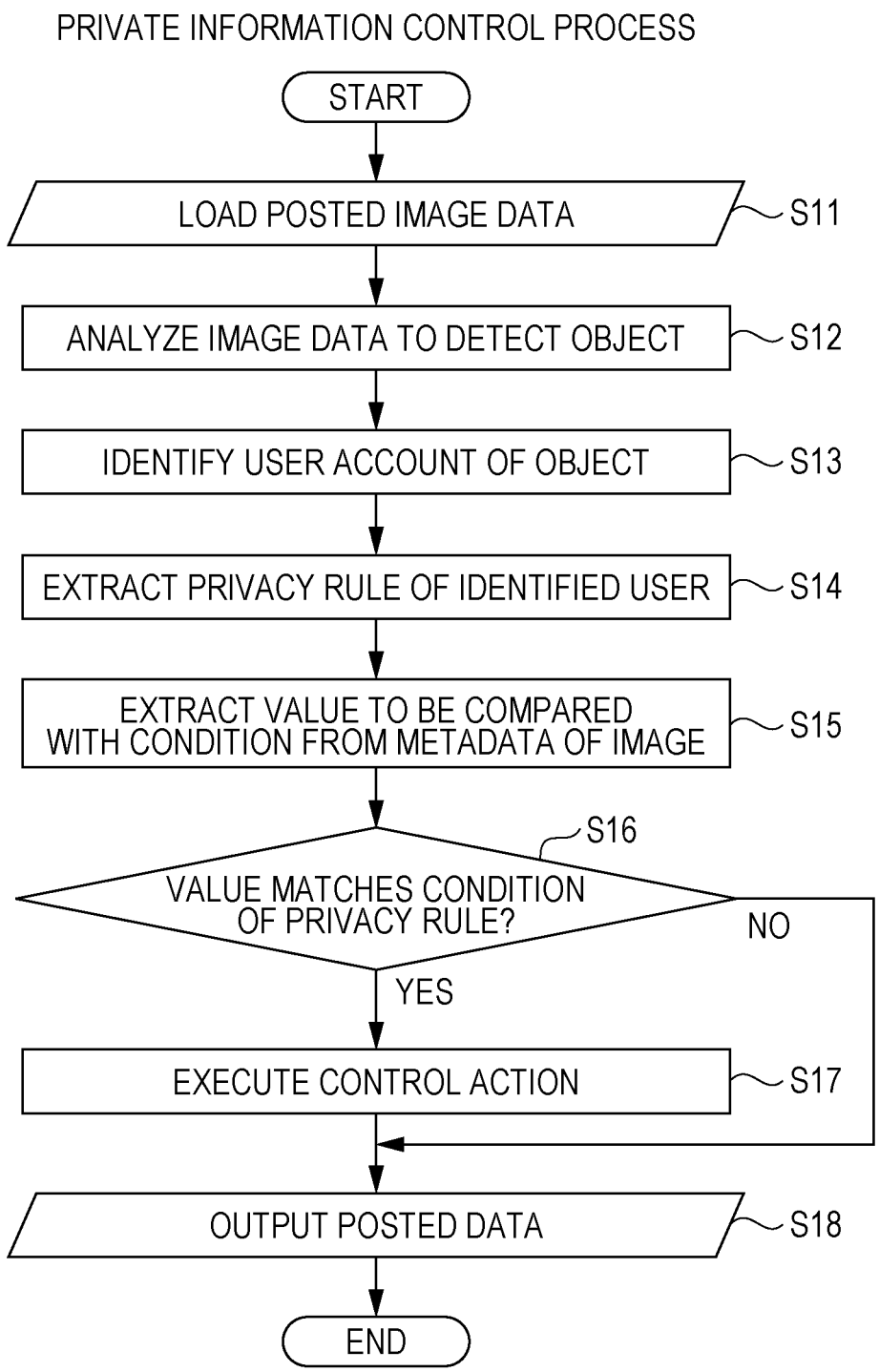

AUTOMATED MANAGEMENT OF PRIVATE INFORMATION

This Application claims priority under 35 U.S.C. §371 to International Application No. PCT/JP2012/074110 filed on Sep. 20, 2012, which claims priority to Japanese Patent Application No. JP2011-266150 filed on Dec. 5, 2011. The contents of both aforementioned applications are incorporated herein by reference.

TECHNICAL FIELD

The present invention relates to an apparatus, a method, and a program that suppress leakage of private information.

BACKGROUND ART

Hitherto, there have been provided web services, such as SNS (Social Networking Service), allowing individual users to disclose information on the Internet. Such web services generally do not restrict another user from disclosing information related to a certain user. Posted messages or images to be disclosed sometimes contain private information of a user other than the person who posted the messages or images.

In view of such circumstances, there are provided services for outputting an alert when a preset keyword is disclosed (see, for example, NPL 1). Also, there have been proposed techniques, such as a technique of warning a user of a privacy violation (see, for example, PTL 1), a technique of analyzing posted data and calculating urgency (see, for example, PTL 2), a technique of automatically updating privacy settings (see, for example, PTL 3), and a technique of automatically creating a profile (see, for example, PTL 4).

CITATION LIST

Patent Literature

PTL 1: Japanese Unexamined Patent Application Publication No. 2010-97336
PTL 2: Japanese Unexamined Patent Application Publication No. 2010-238237
PTL 3: Japanese Unexamined Patent Application Publication (Translation of PCT Application) No. 2010-539565
PTL 4: Japanese Unexamined Patent Application Publication (Translation of PCT Application) No. 2008-517402

Non Patent Literature

NPL 1: Me on the Web, [Nov. 24, 2011], the Internet <http://www.google.com/support/accounts/bin/answer.py?hl=ja&answer=1181793>

SUMMARY OF INVENTION

Technical Problem

Information disclosed via web services often includes image data of still images or moving images. In this case, if such image data contains an image of a face, a vehicle number, or the like that can be used to identify a user, the image data may possibly be private information of the user, depending on the combination conditions of the image data and its metadata, such as the date and time or the location at which this image data was created (obtained).

However, with the aforementioned related techniques, it is difficult to detect image data that may possibly be private information depending on the combination conditions of the image data and its metadata and to restrict the image data from being disclosed in advance of disclosure of the image data. Also, because such combination conditions differ from user to user and are complicated, it is difficult to preset privacy rules that cover all possible conditions.

The present invention aims to provide a private information management apparatus, a method, and a program that allow individual users to easily set and apply privacy rules.

Solution to Problem

A first embodiment of the present invention provides a private information management apparatus that suppresses leakage of private information. The private information management apparatus receives setting data from a terminal of a user, and creates a privacy rule that defines a condition for restricting disclosure of private information and a restriction method. In the case where undisclosed image data contains private information of the user, the private information management apparatus extracts metadata contained in this undisclosed image data, and determines whether or not the metadata satisfies the condition for restricting disclosure of the private information. If it is determined that the condition is satisfied, the private information management apparatus executes the restriction method defined by the privacy rule.

Also, the private information management apparatus restricts disclosure of the private information of the user contained in an image that was captured at a location near a determined location of this terminal after a start instruction was received from the terminal of the user.

Also, other embodiments of the present invention can provide a method allowing a computer to execute functions of the above-described private information management apparatus and a program causing a computer to execute the method.

Advantageous Effects of Invention

In accordance with the present invention, the private information management apparatus creates and applies, in accordance with setting data received from a terminal of a user, a privacy rule that defines a condition for restricting disclosure of private information and a restriction method. In this way, the private information management apparatus can restrict disclosure of private information that is contained in undisclosed image data and satisfies the condition, in advance of disclosure. Therefore, individual users can easily set and apply their privacy rules.

BRIEF DESCRIPTION OF DRAWINGS

FIG. 4 is a diagram illustrating an example of a privacy rule in accordance with the embodiment.
FIG. 5 is a diagram illustrating an example of a privacy rule for prohibiting disclosure of private information in accordance with the embodiment.

FIG. 6 is a diagram illustrating an example of an alert window displayed on a user terminal of a posting person in accordance with the embodiment.

FIG. 7 is a diagram illustrating an example of a privacy rule for making a request to approve disclosure of private information in accordance with the embodiment.

FIG. 8 is a diagram illustrating an example of an alert window displayed on a user terminal in accordance with the embodiment.

FIG. 9 is a flowchart illustrating a process performed to start applying a privacy rule in accordance with the embodiment.

FIG. 10 is a flowchart illustrating a process of controlling private information in accordance with the embodiment.

DESCRIPTION OF EMBODIMENTS

An example of an embodiment of the present invention will be described below with reference to the drawings.

A private information management apparatus 1 according to the present embodiment is a server apparatus that provides a function of suppressing leakage of private information via an SNS.

Figure 1:
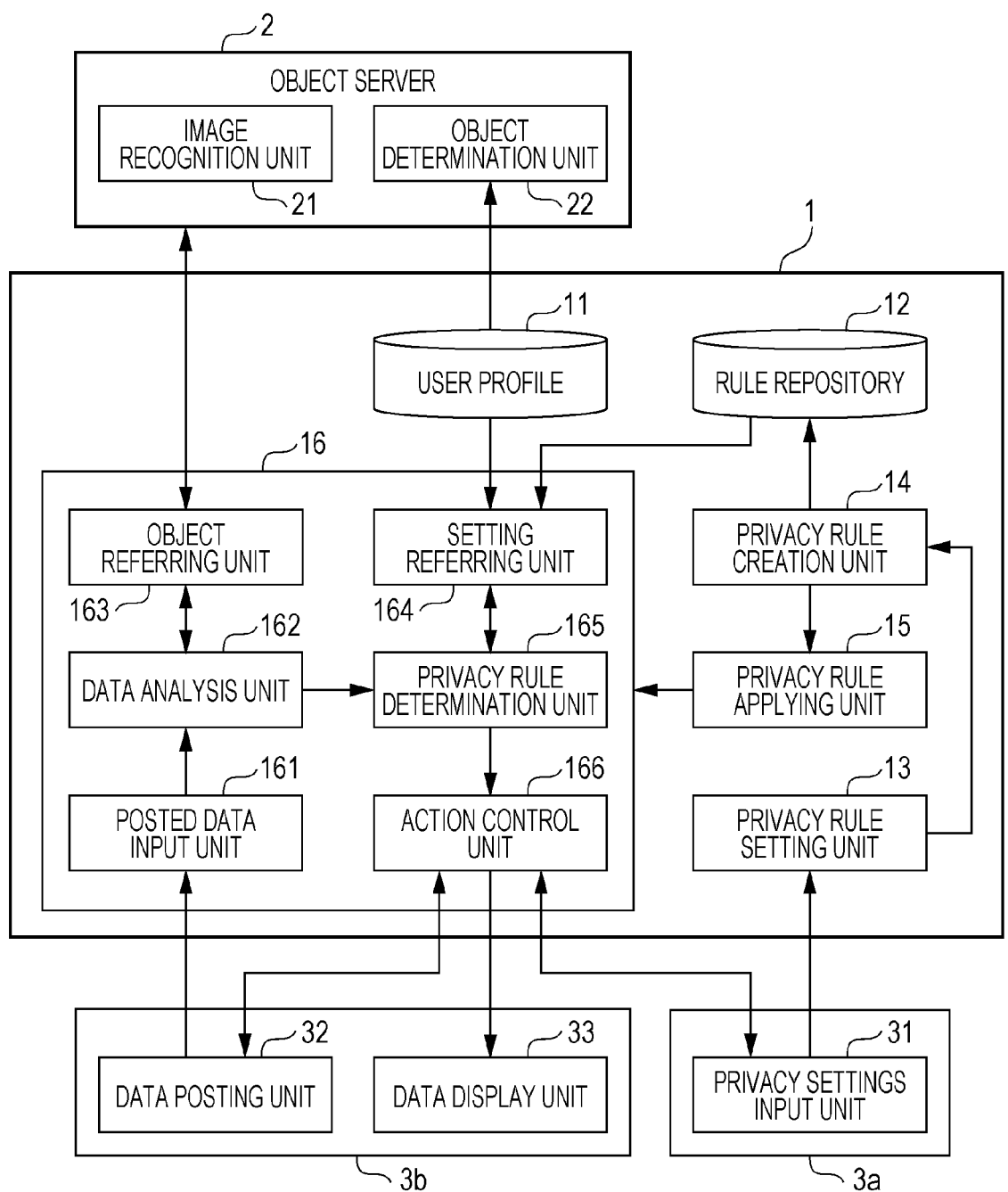
FIG. 1 is a block diagram illustrating the overall configuration of a system including a private information management apparatus according to an embodiment.

FIG. 1 is a block diagram illustrating the overall configuration of a system including the private information management apparatus 1 according to the present embodiment.

The private information management apparatus 1 is connected to an object server 2 directly or via a network. The private information management apparatus 1 also performs wired or wireless communication with user terminals 3 in response to requests from the user terminals 3 such as PCs or mobile terminals used by a plurality of users.

The private information management apparatus 1 includes a user profile 11 (a profile memory unit), a rule repository 12 (a privacy rule memory unit), a privacy rule setting unit 13 (a first reception unit), a privacy rule creation unit 14 (a creation unit), a privacy rule applying unit 15, and a private information control unit 16.

The private information control unit 16 includes a posted data input unit 161, a data analysis unit 162, an object referring unit 163, a setting referring unit 164, a privacy rule determination unit 165 (a determination unit), and an action control unit 166 (an execution unit, a transmission request unit, and a second reception unit).

The object server 2 includes an image recognition unit 21 and an object determination unit 22.

A user terminal 3a (a terminal of a first user) used to set a privacy rule includes a privacy settings input unit 31. A user terminal 3b (a terminal of a second user) used to post an image includes a data posting unit 32 and a data display unit 33.

The user profile 11 stores, for each user, profile data representing private information of the user. The profile data includes image data of the face of the user or user's friend, the user's vehicle number, the user's pet, the user's belongs, or the like; or audio data. The profile data is data that may possibly be private information depending on the combination conditions of image data (of a still image or moving image) and the capturing date and time or capturing location of the image data.

For simplicity of explanation, it is assumed hereinafter that the profile data is image data.

The user profile 11 also stores a privacy-rule mutual reference relationship between the user and another user, which will be described later.

The rule repository 12 stores, for each user, a privacy rule created by the privacy rule creation unit 14 described later.

The privacy rule setting unit 13 receives, from the user terminal 3a, setting data (first setting data) used to create a privacy rule that defines conditions for restricting disclosure of private information and a control action (a restriction method).

The setting data contains parameters of preset condition items included in a template. The setting data also includes instruction data for selecting a control action from among a predetermined number of preset control actions.

Figure 2:
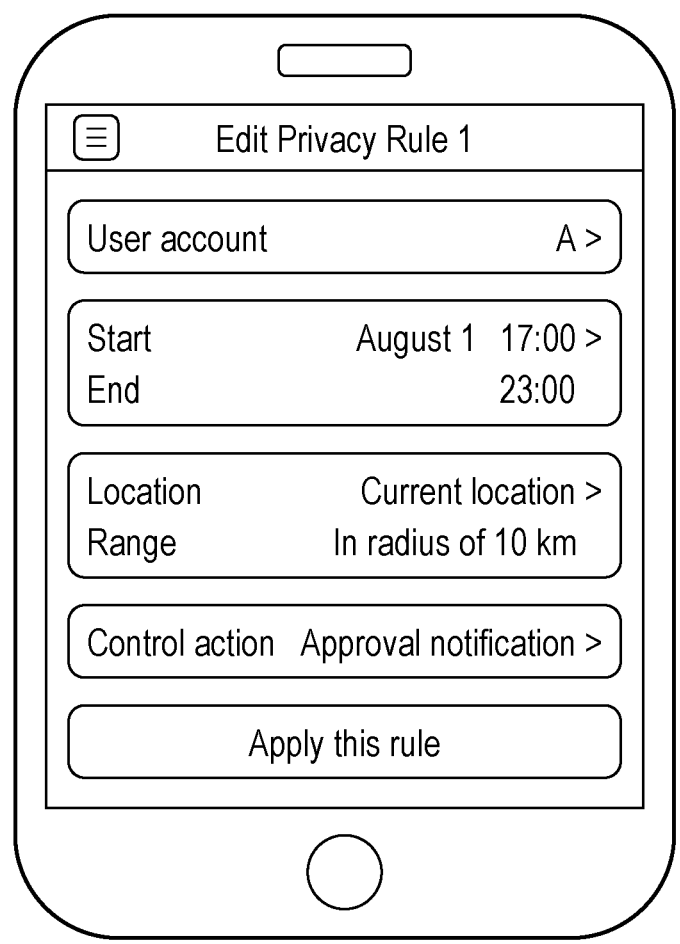
FIG. 2 is a diagram illustrating an example of a first display window used to define a privacy rule in accordance with the embodiment.

FIG. 2 is a diagram illustrating an example of a first display window used to define a privacy rule with the user terminal 3a in accordance with the embodiment.

In this example, the privacy settings input unit 31 of the user terminal 3a accepts conditions, which set profile data included in images related to a user account A and captured over a period from "August 1, 17:00" to "23:00" within a radius of 10 km from the current location of the user terminal 3a as private information. Note that the current location of the user terminal 3a is obtained based on GPS positioning information or base station information.

The privacy settings input unit 31 also accepts "approval notification", which indicates whether or not to permit disclosure is confirmed each time, as a selected control action to be executed in the case where undisclosed image data posted on the SNS contains the private information.

The setting data representing these conditions and the control action is transmitted to the private information management apparatus 1.

Figure 3:
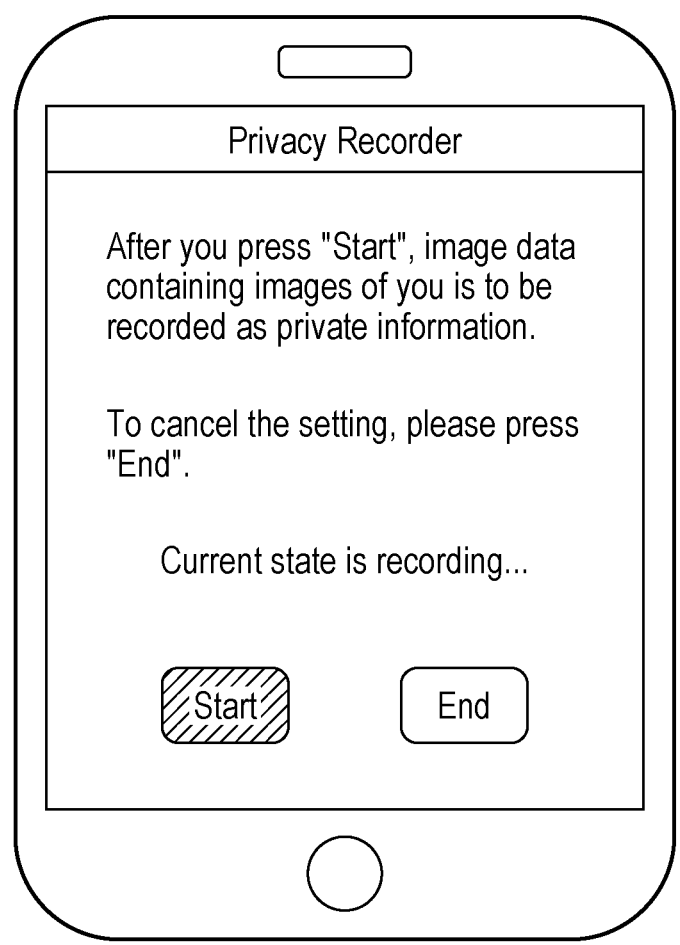
FIG. 3 is a diagram illustrating an example of a second display window used to define a privacy rule in accordance with the embodiment.

FIG. 3 is a diagram illustrating an example of a second display window used to define a privacy rule with the user terminal 3a in accordance with the present embodiment.

In this example, in response to pressing of a start button, the private information management apparatus 1 is notified of a start instruction. The time at which this start instruction is received is set as the start date and time of the capturing-date-and-time condition used to identify the private information. In response to pressing of an end button, the private information management apparatus 1 is notified of an end instruction. The time at which this end instruction is received is set as the end date and time of the capturing-date-and-time condition used to identify the private information.

That is, over a "recording" period from when the start button is pressed to when the end button is pressed, images related to the user are identified as private information and disclosure thereof is restricted. Note that the start date and time and the end date and time are provided by a clock function included in the user terminal 3a or the private information management apparatus 1.

Also, in the case where the capturing location is within a range including the determined location of the user terminal 3a, profile data related to the user is identified as the private information in the "recording" state. Note that the private information management apparatus 1 may be notified of the location of the user terminal 3a at regular intervals.

The privacy rule creation unit 14 creates, for each user, a privacy rule in accordance with the setting data received by the privacy rule setting unit 13. The privacy rule creation unit 14 then stores the created privacy rule in the rule repository 12.

FIG. 4 is a diagram illustrating an example of a privacy rule stored in the rule repository 12 in accordance with the present embodiment.

In this example, values of conditions to be compared are each written at a tag <AttributeValue>. Specifically, image data containing a user "A" and satisfying conditions of the capturing date and time of "Aug. 1, 2011, 17:00 to 23:00" and the capturing location of "within 10000 (m) from Shibuya (at latitude 35°658735' north, longitude 139°701363' east)" is defined as image data restricted from being disclosed.

At this time, evaluation functions are used to perform condition-based determination. For example, a function (function:person-match) that uses person-object determination to determine whether or not image data includes a specified person, a function (fuction:dateTime-[greaterlless]-than) that uses the standard date and time format to determine whether or not the image data includes the date and time satisfying the condition, a function (function:location-around) that uses the longitude and latitude to determine whether the image data includes information associated with the vicinity of a specified location, and so on are used.

Also, a control action to be executed when image data contains private information is written at a tag <Obligations>.

Note that control actions such as prohibition of disclosure, permission of disclosure through masking, approval notification, and disclosure notification are defined in accordance with the above-described setting data.

The privacy rule applying unit 15 instructs the private information control unit 16 to apply the privacy rule stored in the rule repository 12.

Based on the privacy rule for which an application instruction is received from the privacy rule applying unit 15, the private information control unit 16 detects private information contained in undisclosed image data and executes a predetermined control action.

The posted data input unit 161 receives data posted on the SNS from the user via the data posting unit 32 of the user terminal 3b (the terminal of the second user).

The data analysis unit 162 analyzes undisclosed image data contained in the posted data and metadata attached to this undisclosed image data, and extracts an object for which determination is to be performed using the privacy rule. Specifically, the data analysis unit 162 obtains, via the object referring unit 163, a result of comparison of the image data with profile data performed by the object server 2. The data analysis unit 162 also extracts data to be compared with the conditions from the metadata, and provides the extracted data to the privacy rule determination unit 165.

In response to a request from the data analysis unit 162, the object referring unit 163 accesses the object server 2, obtains the comparison result of the undisclosed image data and the profile data, and supplies the comparison result to the data analysis unit 162.

The image recognition unit 21 of the object server 2 identifies an object existing in image data.

The object determination unit 22 compares the object identified by the image recognition unit 21 with the profile data stored in the user profile 11, and determines whether or not the image data contains an image that may possibly be private information.

The setting referring unit 164 obtains a privacy rule for each user from the rule repository 12 and a privacy-rule mutual reference relationship from the user profile 11, and provides the privacy rule and the privacy-rule mutual reference relationship to the privacy rule determination unit 165.

In the case where undisclosed image data requested to be disclosed on the SNS contains private information represented by the profile data of a certain user, the privacy rule determination unit 165 extracts metadata contained in this undisclosed image data and determines whether or not the metadata satisfies the conditions for restricting disclosure of the private information.

The metadata is, for example, Exif information of image data or the like, and contains the capturing date and time and the capturing location. The privacy rule determination unit 165 determines whether or not these pieces of information satisfy conditions defined by the privacy rule of the user.

In the case where it is determined by the privacy rule determination unit 165 that the metadata satisfies the conditions, the action control unit 166 executes a control action defined by the privacy rule. Specifically, the action control unit 166 provides image data obtained by masking the private information to the data display unit 33 that displays the data on the user terminal 3b with which posted data is viewed. In the case where disclosure is prohibited, the action control unit 166 provides display data indicating that disclosure is denied to the data display unit 33 of the user terminal 3b that has made a disclosure request.

FIG. 5 is a diagram illustrating an example of a privacy rule for prohibiting disclosure of private information in accordance with the present embodiment.

In this example, the action control unit 166 prohibits another person from uploading an image of the user "A" and causes the user terminal 3b of the posting person to display an alert window thereon.

FIG. 6 is a diagram illustrating an example of an alert window displayed on the user terminal 3b of the posting person in accordance with the present embodiment.

In this example, image data requested to be disclosed by the posting person contains private information of the user "A". Accordingly, a message indicating that disclosure of the image is denied is displayed so as to prompt the posting person to confirm the message.

The action control unit 166 may execute the control action in the case where execution of the control action is approved by the user terminal 3b (the data posting unit 32) of the second user who made a request to disclose the undisclosed image data. For example, in the case where the user profile 11 stores a mutual reference setting with which the first user and the second user mutually approve application of their privacy rules in advance, the control action may be executed. Alternatively, all the privacy rules may be automatically applied based on the precondition of using the SNS.

In the case where "approval notification" is selected as the control action, the action control unit 166 receives second setting data representing a control action from the user terminal 3a (the privacy settings input unit 31) of the first user if it is determined by the privacy rule determination unit 165 that the metadata satisfies the conditions. In this case, the action control unit 166 executes the control action represented by the received second setting data instead of the control action predetermined by the privacy rule.

Note that this second setting data may be data representing a control action selected from among a plurality of control action candidates, or permission or denial of execution of the control action predetermined by the privacy rule.

At this time, in the case where it is determined by the privacy rule determination unit 165 that the metadata satisfies the conditions, the action control unit 166 transmits the undisclosed image data to the user terminal 3a of the first user so as to request the user terminal 3a to transmit the second setting data.

FIG. 7 is a diagram illustrating an example of a privacy rule for making a request to approve disclosure of private information in accordance with the present embodiment.

In this example, in the case where it is determined that undisclosed image data contains private information of the user "A", the action control unit 166 causes the user terminal 3a of the user "A" to display an alert window thereon.

FIG. 8 is a diagram illustrating an example of an alert window displayed on the user terminal 3a in accordance with the present embodiment.

In this example, options for the control action to be executed for the private information are displayed, and the control action selected by the user "A" is executed by the action control unit 166. Note that two options, i.e., permission and denial, may be provided. In this case, the control action may be selected by pressing one of buttons "YES" and "NO".

On the alert window, a link to the undisclosed image data subjected to the control action is also displayed. This link allows the user "A" to check the actual image and select the appropriate control action. Note that in the case where this undisclosed image data contains private information of a user other than the user "A", such private information is preferably masked.

FIG. 9 is a flowchart illustrating a process performed to start applying a privacy rule in accordance with the present embodiment.

In step S1, the privacy rule setting unit 13 receives, from the user terminal 3a, input of setting data used to define a privacy rule.

In step S2, the privacy rule creation unit 14 creates, for each user, a privacy rule in accordance with the setting data received in step S1.

In step S3, the privacy rule creation unit 14 registers the privacy rule created in step S2 to the rule repository 12.

In step S4, the privacy rule applying unit 15 determines whether or not the private information management apparatus 1 is configured to automatically apply privacy rules. If YES is obtained through the determination, it is assumed that all the privacy rules are approved and the process proceeds to step S7. If NO is obtained through the determination, the process proceeds to step S5.

In step S5, the privacy rule applying unit 15 requests another user to approve mutual reference, in response to an instruction received from the user terminal 3a.

In step S6, the privacy rule applying unit 15 receives approval for mutual reference from the user terminal 3 of a counterpart of the person who made the approval request in step S5.

In step S7, the privacy rule applying unit 15 starts applying the approved privacy rule.

Note that the processing for obtaining the approval for mutual reference performed in steps S5 and S6 may be executed along with a standard friend registration sequence of the SNS.

FIG. 10 is a flowchart illustrating a process of controlling private information in accordance with the present embodiment.

In step S11, the posted data input unit 161 loads undisclosed image data posted by the user terminal 3b.

In step S12, the data analysis unit 162 analyzes the undisclosed image data loaded in step S11, using the object server 2 (the image recognition unit 21) via the object referring unit 163 so as to detect an object, such as a person, that may possibly be private information.

In step S13, the data analysis unit 162 identifies a user account of the object detected in step S12, using the object server 2 (the object determination unit 22) via the object referring unit 163.

In step S14, the privacy rule determination unit 165 extracts a privacy rule associated with the user account identified in step S13 from the rule repository 12 via the setting referring unit 164.

In step S15, the data analysis unit 162 extracts values to be compared with conditions defined by the privacy rule, such as the capturing date and time and the capturing location, from metadata contained in the undisclosed image data.

In step S16, the privacy rule determination unit 165 determines whether or not any of the values extracted in step S15 satisfies the corresponding condition defined by the privacy rule. If YES is obtained through this determination, the process proceeds to step S17. If NO is obtained through this determination, the process proceeds to step S18.

In step S17, the action control unit 166 executes the control action defined by the privacy rule because it is determined in step S16 that the undisclosed image data contains private information.

In step S18, the action control unit 166 outputs the posted data obtained by performing the control action in step S17 or the posted data in the case where it is determined in step S16 that the undisclosed image data does not contain private information.

As described above, in accordance with the present embodiment, the private information management apparatus 1 receives setting data based on a template from the user terminal 3a, and creates, for each user, a privacy rule. Then, the private information management apparatus 1 applies the privacy rule to posted data. In this way, the private information management apparatus 1 can execute a predetermined control action for the undisclosed image data containing private information. Therefore, the first user can easily set and apply the privacy rule by inputting setting data based on the template.

At this time, the private information management apparatus 1 can use a location range as well as a time range as conditions to be used to determine whether or not undisclosed image data contains private information. This can improve accuracy of the determination, and can limit the search range and consequently reduces the processing load.

The private information management apparatus 1 can apply the privacy rule in real time upon receipt of instructions regarding the start time and the end time of the time range through pressing of a button or the like from the user terminal 3a. Therefore, the first user can apply the privacy rule via a simple interface at an appropriate timing.

The private information management apparatus 1 can automatically acquire a location range to be used to identify the private information by setting the positioning information of the user terminal 3a in the template. Therefore, the first user can easily apply the privacy rule using his/her current position as a condition.

The user terminal 3a is preferably a mobile terminal. In this case, the first user can easily apply the privacy rule including the current time and the current location as conditions at an appropriate timing.

The control action is selected from among a predetermined number of preset options. Therefore, the first user can easily define the privacy rule.

Further, the first user is permitted to select the control action upon receipt of a request to approve posted data, and thus can appropriately change or confirm the control action. This improves the convenience. Also, the first user can execute an appropriate control action by checking undisclosed image data transmitted from the private information management apparatus 1.

Even if a configuration is made by the administrator of the site such that privacy rules are not to be applied, the private information management apparatus 1 allows users to mutually apply their privacy rules for posted data by setting a privacy-rule mutual reference setting.

Figure 11:
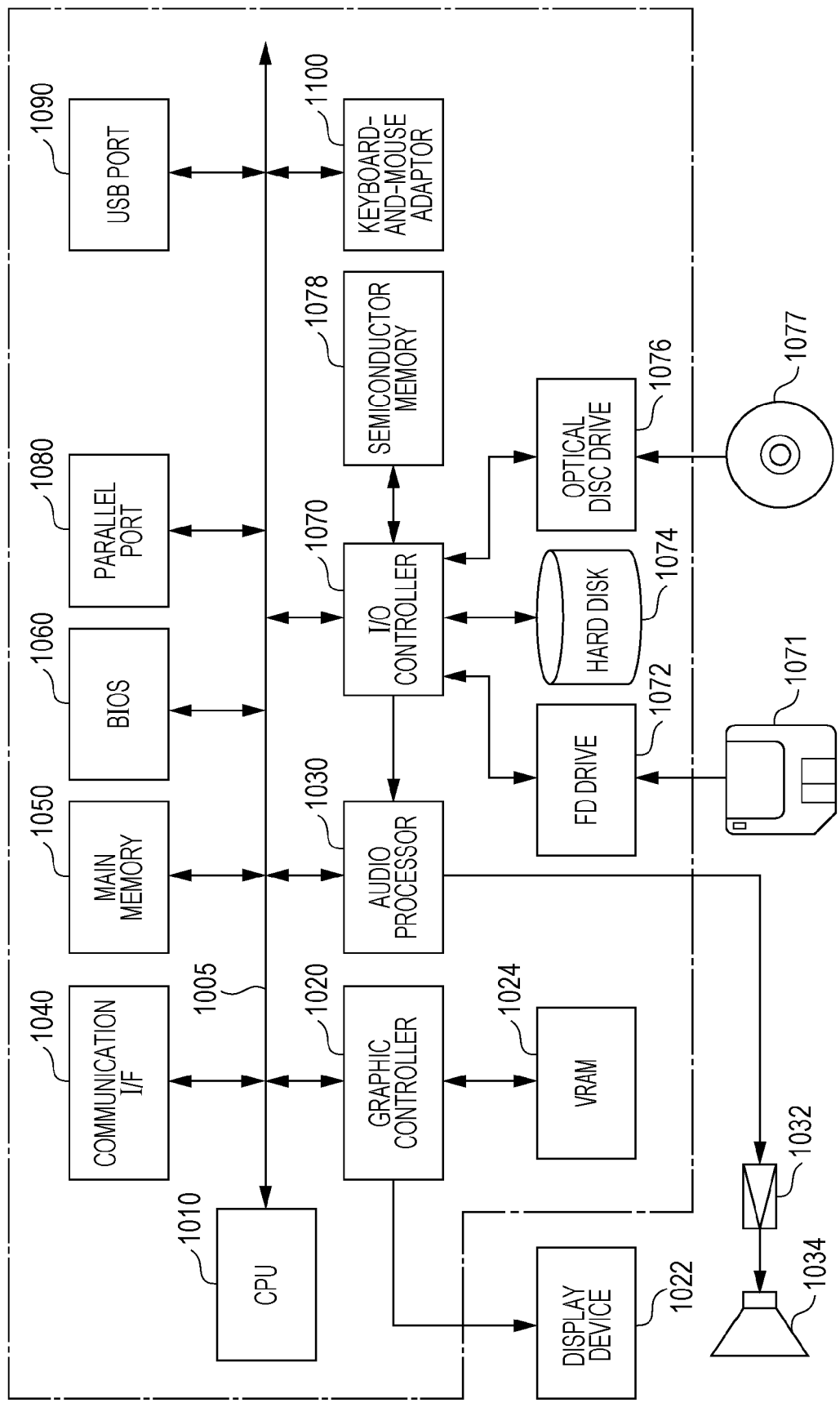
FIG. 11 is a diagram illustrating the hardware configuration of the private information management apparatus according to the embodiment.

FIG. 11 is a diagram illustrating the hardware configuration of the private information management apparatus 1 according to the present embodiment. A general configuration of the private information management apparatus 1 will be described below using an information processing apparatus 1000 which is typically a computer. It is obvious that, in the case of a dedicated machine or an embedded apparatus, the minimum mandatory configuration is selectable in accordance with its environment. Also, the following describes the hardware configuration of the private information management apparatus 1. The object server 2 and the user terminal 3 have the hardware configurations similar to that of the private information management apparatus 1.

The information processing apparatus 1000 includes a CPU (Central Processing Unit) 1010, a bus line 1005, a communication I/F 1040, a main memory 1050, a BIOS (Basic Input Output System) 1060, a parallel port 1080, a USB port 1090, a graphic controller 1020, a VRAM 1024, an audio processor 1030, an I/O controller 1070, and input means such as a keyboard-and-mouse adapter 1100. Storage means, such as a flexible disk (FD) drive 1072, a hard disk 1074, an optical disc drive 1076, and a semiconductor memory 1078, can be connected to the I/O controller 1070.

A display device 1022 is connected to the graphic controller 1020. An amplifier circuit 1032 and a speaker 1034 are connected to the audio processor 1030.

The BIOS 1060 stores a boot program executed by the CPU 1010 at the time of booting of the information processing apparatus 1000, programs dependent on hardware of the information processing apparatus 1000, and so forth. The FD (flexible disk) drive 1072 reads out programs or data from a flexible disk 1071 and supplies the programs or the data to the main memory 1050 or the hard disk 1074 via the I/O controller 1070. Although FIG. 11 illustrates an example in which the hard disk 1074 is included in the information processing apparatus 1000, the hard disk 1074 may be externally connected to or added to the information processing apparatus 1000 by connecting an external device connection interface (not illustrated) to the bus line 1005 or the I/O controller 1070.

For example, a DVD-ROM drive, a CD-ROM drive, a DVD-RAM drive, or a BD (Blu-ray Disk)-ROM drive can be used as the optical disc drive 1076. In this case, it is necessary to use an optical disc 1077 corresponding to each drive. The optical disc drive 1076 reads programs or data from the optical disc 1077 and may supply the programs or the data to the main memory 1050 or the hard disk 1074 via the I/O controller 1070.

Computer programs supplied to the information processing apparatus 1000 may be stored on a recording medium, such as the flexible disk 1071, the optical disc 1077, or a memory card, and provided by a user. The computer programs are read out from the recording medium via the I/O controller 1070 or are downloaded via the communication I/F 1040, thereby being installed into the information processing apparatus 1000 and executed. Since the operations that the computer programs cause the information processing apparatus 1000 to perform are the same as those performed in the apparatus having been already described, the description thereof is omitted.

The computer programs described above may be stored on external recording media. In addition to the flexible disk 1071, the optical disc 1077, or the memory card, a magneto-optical recording medium such as an MD and a tape medium can be used as the recording media. In addition, the computer programs may be supplied to the information processing apparatus 1000 via a communication network using a storage device, such as a hard disk or an optical disc library, provided in a server system connected to a private communication network or the Internet as the recording medium.

The information processing apparatus 1000 has been mainly described in the above example. Functions similar to those of the above-described information processing apparatus 1000 can be realized by installing programs having the functions described regarding the information processing apparatus 1000 into a computer and causing the computer to function as the information processing apparatus 1000. Therefore, the information processing apparatus 1000 that has been described as one embodiment of the present invention may be implemented by a method and a computer program implementing the method.

The apparatus can be implemented as hardware, software, or a combination of hardware and software. When the apparatus is embodied by the combination of hardware and software, an embodiment as a computer system having a predetermined program can be a typical example. In such a case, the predetermined program is loaded to the computer system and executed, thereby causing the computer system to perform processes according to the present invention. This program may be constituted by a group of instructions representable by a given language, code, or description. Such a group of instructions enables the system to perform specific functions directly or after one of or both of (1) conversion to another language, code, or description and (2) copying to another medium are performed. Needless to say, the present invention includes not only such a program itself but also a program product having the program recorded on a medium within a scope thereof. The program for enabling execution of functions of the present invention can be stored on any computer-readable medium, such as a flexible disk, an MO, a CD-ROM, a DVD, a hard disk drive, a ROM, a RAM, an M-RAM (Magnetoresistive RAM), or a flash memory. To store such a program on a computer-readable medium, the program can be downloaded from another computer system connected via a communication network or copied from another medium. Additionally, such a program may be stored on one or a plurality of recording media after being compressed or divided into a plurality of portions.

Although the embodiment of the present invention has been described above, the present invention should not be limited to the above-described embodiment. In addition, advantages discussed in the embodiment of the present invention are merely most preferable advantages resulting from the present invention and the advantages of the present invention should not be limited to those discussed in the embodiment of the present invention.

For example, in the embodiment above, the description has been given using image data as profile data. However, audio data can be handled in the similar manner. In this case, an audio analysis unit (not illustrated) configured to analyze voice print or the like of audio data contained in moving image data is provided in addition to the image recognition unit 21.

Also, the private information management apparatus 1 may include the functions of the object server 2. Alternatively, the private information management apparatus 1 may be constituted by a plurality of apparatuses (servers) to which the above-described plurality of functional blocks are distributed.

REFERENCE SIGNS LIST 1 private information management apparatus
2 object server
3, 3a, 3b user terminal
11 user profile
12 rule repository 13 privacy rule setting unit
14 privacy rule creation unit
15 privacy rule applying unit
16 private information control unit
161 posted data input unit
162 data analysis unit
163 object referring unit
164 setting referring unit
165 privacy rule determination unit
166 action control unit

The invention claimed is:

1. An computing apparatus for managing private information, comprising:
   a profile memory unit configured to store profile data representing private information of a first user;
   a first reception unit configured to receive first setting data from a terminal of the first user, the first setting data being based on a predetermined template used to create a privacy rule defining a condition for restricting disclosure of the private information and a restriction method;
   a creation unit configured to create the privacy rule in accordance with the first setting data received by the first reception unit;
   a privacy rule memory unit configured to store the privacy rule created by the creation unit;
   a determination unit configured to, in a case where undisclosed image data requested to be disclosed on a predetermined website contains the private information represented by the profile data, extract metadata contained in the undisclosed image data and determine whether or not the metadata satisfies the condition for restricting disclosure of the private information; and
   an execution unit configured to, in a case where it is determined by the determination unit that the metadata satisfies the condition, execute the restriction method defined by the privacy rule.

2. The computing apparatus according to claim 1, wherein the condition for restricting disclosure of the private information includes a range related to a capturing date and time of the undisclosed image data.

3. The computing apparatus according to claim 2, wherein the range related to the capturing date and time is a range from when a start instruction is received to when an end instruction is received from the terminal of the first user.

4. The computing apparatus according to claim 1, wherein the condition for restricting disclosure of the private information includes a range related to a capturing location of the undisclosed image data.

5. The computing apparatus according to claim 4, wherein the range related to the capturing location is a predetermined range including a determined location of the terminal of the first user.

6. The computing apparatus according to claim 1, wherein the first reception unit receives, from the terminal of the first user, the first setting data containing an instruction regarding a restriction method selected from among a predetermined number of preset restriction methods in order to define the restriction method to be used to restrict disclosure of the private information.

7. The computing apparatus according to claim 1, wherein the execution unit executes the restriction method in a case where a second user who made a request to disclose the undisclosed image data approves execution of the restriction method.

8. The computing apparatus according to claim 1, wherein the restriction method is selected from a group of predefined restriction methods comprising prohibition of disclosure, permission of disclosure through masking, approval notification and disclosure notification.

9. The computing apparatus according to claim 1, wherein the profile data comprises a mutual reference setting indicating the first user and a second user mutually approve application of their respective privacy rules.

10. An computing apparatus for managing private information, comprising:
    a profile memory unit configured to store profile data representing private information of a first user;
    a first reception unit configured to receive first setting data from a terminal of the first user, the first setting data being based on a predetermined template used to create a privacy rule defining a condition for restricting disclosure of the private information and a restriction method;
    a creation unit configured to create the privacy rule in accordance with the first setting data received by the first reception unit;
    a privacy rule memory unit configured to store the privacy rule created by the creation unit;
    a determination unit configured to, in a case where undisclosed image data requested to be disclosed on a predetermined website contains the private information represented by the profile data, extract metadata contained in the undisclosed image data and determine whether or not the metadata satisfies the condition for restricting disclosure of the private information; and
    an execution unit configured to, in a case where it is determined by the determination unit that the metadata satisfies the condition, execute the restriction method defined by the privacy rule; and
    a second reception unit configured to receive, from the terminal of the first user, second setting data representing the restriction method in a case where it is determined by the determination unit that the metadata satisfies the condition, wherein
    in the case where the second setting data is received, the execution unit executes the restriction method represented by the second setting data instead of the restriction method defined by the privacy rule.

11. The computing apparatus according to claim 10, further comprising
    a transmission request unit configured to, in a case where it is determined by the determination unit that the metadata satisfies the condition, transmit the undisclosed image data to the terminal of the first user so as to request the terminal of the first user to transmit the second setting data.

12. A method for a computer to suppress leakage of private information, the computer including a profile memory unit configured to store profile data representing private information of a user, the method comprising:
    receiving setting data from a terminal of the user, the setting data being based on a predetermined template used to create a privacy rule defining a condition for restricting disclosure of the private information and a restriction method;
    creating the privacy rule in accordance with the setting data received in the reception step;
    storing the privacy rule created in the creation step;
    a determination step of, in a case where undisclosed image data requested to be disclosed on a predetermined website contains the private information represented by the profile data, extracting metadata contained in the undisclosed image data and determining whether or not the metadata satisfies the condition for restricting disclosure of the private information; and an execution step of, in a case where it is determined in the determination step that the metadata satisfies the condition, executing the restriction method defined by the privacy rule.

13. The method according to claim 12, wherein the restriction method is selected from a group of predefined restriction methods comprising prohibition of disclosure, permission of disclosure through masking, approval notification and disclosure notification.

14. The method according to claim 12, further comprising:
receiving, from the terminal of the first user, second setting data representing the restriction method in a case where it is determined by the determination unit that the metadata satisfies the condition, wherein
responsive to receiving the second setting data, executing the restriction method represented by the second setting data instead of the restriction method defined by the privacy rule.

15. The method according to claim 12, wherein the profile data comprises a mutual reference setting indicating the first user and a second user mutually approve application of their respective privacy rules.

16. A computer program product for suppressing leakage of private information, the computer program product comprising a non-transitory computer readable medium having program instructions embodied therewith, the program instructions executable by a data processing system to cause the data processing system to perform steps of:
receiving setting data from a terminal of the user, the setting data being based on a predetermined template used to create a privacy rule defining a condition for restricting disclosure of the private information and an executable restriction method;
creating the privacy rule in accordance with the setting data received in the reception step;
storing the privacy rule created in the creation step;
a determination step of, in a case where undisclosed image data requested to be disclosed on a predetermined website contains the private information represented by the profile data, extracting metadata contained in the undisclosed image data and determining whether or not the metadata satisfies the condition for restricting disclosure of the private information; and
an execution step of, in a case where it is determined in the determination step that the metadata satisfies the condition, executing the executable restriction method defined by the privacy rule.

17. The computer program product according to claim 16, wherein the restriction method is selected from a group of predefined restriction methods comprising prohibition of disclosure, permission of disclosure through masking, approval notification and disclosure notification.

18. The computer program product according to claim 16, further comprising:
receiving, from the terminal of the first user, second setting data representing the restriction method in a case where it is determined by the determination unit that the metadata satisfies the condition, wherein
responsive to receiving the second setting data, executing the restriction method represented by the second setting data instead of the restriction method defined by the privacy rule.

19. The computer program product according to claim 16, wherein the profile data comprises a mutual reference setting indicating the first user and a second user mutually approve application of their respective privacy rules.

* * * * *

UNITED STATES PATENT AND TRADEMARK OFFICE
CERTIFICATE OF CORRECTION

PATENT NO. : 9,280,682 B2
APPLICATION NO. : 14/362635
DATED : March 8, 2016
INVENTOR(S) : Hayato et al.

It is certified that error appears in the above-identified patent and that said Letters Patent is hereby corrected as shown below:

Claims

At column 11, line 12, claim 1, change "An" to --A--

At column 12, line 7, claim 10, change "An" to --A--

Signed and Sealed this
Thirty-first Day of May, 2016

Michelle K. Lee
*Director of the United States Patent and Trademark Office*